United States Patent [19]

Swamy et al.

[11] Patent Number: 5,444,609

[45] Date of Patent: Aug. 22, 1995

[54] PASSIVE HARMONIC FILTER SYSTEM FOR VARIABLE FREQUENCY DRIVES

[75] Inventors: Mahesh M. Swamy, Salt Lake City; Gerald R. Bisel, Sandy; Steven L. Rossiter, Salt Lake City, all of Utah

[73] Assignee: Energy Management Corporation, Salt Lake City, Utah

[21] Appl. No.: 36,558

[22] Filed: Mar. 25, 1993

[51] Int. Cl.6 .................... H02M 1/12; H02M 1/14
[52] U.S. Cl. ........................................................ 363/47
[58] Field of Search .................... 363/47, 155, 48; 361/48, 90, 91; 333/172, 177, 173, 174

[56] References Cited

U.S. PATENT DOCUMENTS

| | | | |
|---|---|---|---|
| 3,555,291 | 1/1971 | Dewey | 307/105 |
| 3,561,767 | 5/1971 | Bush | 333/76 |
| 3,711,760 | 1/1973 | Kaiser | 321/5 |
| 3,849,677 | 11/1974 | Stacey et al. | 307/295 |
| 4,053,820 | 10/1977 | Peterson et al. | 363/44 |
| 4,228,492 | 10/1980 | Häusler et al. | 363/48 |
| 4,305,114 | 12/1981 | Takagi et al. | 361/342 |
| 4,419,660 | 12/1983 | Bergdahl | 340/653 |
| 4,463,408 | 7/1984 | Kleinecke et al. | 361/342 |
| 4,689,735 | 8/1987 | Young | 363/155 |
| 4,752,751 | 6/1988 | Walker | 333/177 X |
| 4,782,887 | 12/1988 | Bernitz et al. | 363/89 |
| 4,812,669 | 5/1989 | Takeda et al. | 307/105 |
| 4,862,324 | 8/1989 | Kalvaitis et al. | 361/390 |
| 4,930,061 | 5/1990 | Slack et al. | 363/44 |
| 5,077,517 | 12/1991 | Tanove et al. | 323/207 |
| 5,093,641 | 3/1992 | Wolpert | 333/181 |
| 5,162,963 | 11/1992 | Washburn et al. | 363/38 X |

OTHER PUBLICATIONS

"An Active Power Factor Correction Technique is for Thru-Phase Diode Rectifiers," IEEE Transactions on Power Electronics, vol. 6, No. 1 (Jan. 1991).

"Active Input Current Wave Shaping Method for Thru-Phone Diode Rectifiers with Zero Switching Lasses" IEEE Publication No. 0-7803-0453 (May 1991).

Primary Examiner—Thomas M. Dougherty
Assistant Examiner—E. To
Attorney, Agent, or Firm—Lee A. Hollaar; Daniel P. McCarthy

[57] ABSTRACT

A Variable Frequency Drive Power Center incorporating a new passive Harmonic Filter in an improved housing structure for Variable Frequency Drives (VFDs). The new harmonic filter improves the overall system performance by drastically reducing the line side current harmonics generated by all VFDs. The harmonic filter includes a series inductance, a parallel capacitance, and a buck transformer. The filter provides a low impedance path for the harmonic currents generated by VFD and therefore prevents them from flowing into the input ac power lines. The filter also improves the input power factor of the VFD system because of its increased inductive reactance under full-load conditions. Although the filter causes an overvoltage across the VFD terminals because of its increased capacitive reactance at the fundamental frequency this problem is overcome by using the buck transformer. The power center includes a separate section for the harmonic filter and a set of vertically-disposed compartments for mounting a plurality of VFDs on sliding assemblies. This provides a more efficient use of space and ease of maintenance, service and inspection of each individual unit.

14 Claims, 6 Drawing Sheets

PASSIVE HARMONIC FILTER SYSTEM FOR VARIABLE FREQUENCY DRIVES

BACKGROUND OF THE INVENTION

1. Field of the Invention

This invention relates to filters for alternative current circuits, and particularly to passive filters to remove unwanted harmonics generated on an alternating current power line.

2. Description of Related Art

Harmonic filters will increasingly become an essential part of a power system in order to comply with strict codes on harmonics adopted by electric utilities based on the recent Institute of Electrical and Electronics Engineers standard 519. This is particularly true when a Variable Frequency Drive (VFD), which can be a substantial generator of harmonics, is being attached to the power system. All VFDs generate current harmonics which can create problems with an industry's power supply system and also with the utility's power grid. Harmonics also have detrimental effect on telephones and other means of communications. The harmonics generated by VFDs can be grouped into two categories:

(i) Harmonic current generated by the pulsed current pattern at the input of a diode bridge rectifier; and
(ii) Flat voltage top created by the phenomenon of dc bus capacitor being charged by the ac to dc rectifier block in the absence of any series impedance, which causes objectionable voltage harmonics.

In order to study the harmonic effect on a power system, it is essential to define a term by which to measure this harmonic. The most widely accepted term for measuring the harmonic content in a given waveform is the Total Harmonic Distortion (THD). THD is used to define the effect of harmonics on the power system. It is defined as the ratio of the root-mean-square of the harmonic content to the root-mean-square value of the fundamental quantity, expressed as a percent of the fundamental:

$$THD = 100 \times \sqrt{\left[\frac{\text{Sum of squares of amplitudes of all harmonics}}{\text{Square of amplitude of fundamental}}\right]}$$

If the quantity under consideration is voltage, then the definition refers to the Total Voltage Harmonic Distortion or TVHD. If the quantity under consideration is current, the definition then refers to the Total Current Harmonic Distortion or TCHD.

The current harmonics generated by the diode rectifier bridge configuration with a dc bus capacitor (as illustrated in FIG. 1) can be reduced by designing harmonic filters which trap the harmonics generated and thereby do not allow it to travel to the ac power source.

A Variable Frequency Drive (VFD) which uses a thyristor rectifier bridge to regulate the dc bus voltage (as illustrated in FIG. 2) will create notches in the voltage waveform. This is because of the unavoidable system inductance to which a drive is connected. Notching of the voltage happens when an incoming thyristor takes over conduction from an outgoing thyristor. There is a period when both the incoming and the outgoing thyristors conduct creating a temporary line-to-line short-circuit which appears as a notch in the voltage waveform. The notching can cause resonance in an already existing resonance condition which hitherto was unnoticed as there was no excitation for it. The effect of notching is normally reduced on large drives by having either line reactors or input transformers. The reactance of these reactors act as a voltage divider circuit with the supply impedance ratioed to the line reactance such that the notch depth is controlled at 10% or less of the line-to-line voltage. As the reactance of the reactor increases, the notch depth decreases but the overlap duration during commutation increases.

The notching effect is absent in the diode rectifier bridges illustrated in FIG. 1, since there is no firing angle control to regulate the dc bus voltage. Also, most modern rectifier diodes have low turn-off times (typically 7 us) compared to thyristors (typically 100 us) of similar rating so that the overlap duration is minimal and has no notching effect on the input voltage.

In order to reduce the current harmonics, tuned filters between the power supply line and ground are often used. A three-phase, 6-pulse rectifier on the input of the VFD generates a large fifth current harmonic. It is customary to design a harmonic filter tuned to a frequency close to the fifth harmonic. However, a large fifth harmonic filter will offer only capacitive impedance at the fundamental frequency (50 or 60 Hz) and cause an overvoltage across the line-to-line terminals. This overvoltage can be typically as high as 15%. This is a serious drawback as any other load connected on the same network will experience a rise in voltage thereby causing frequent trippings and other fall-outs.

A further difficulty arises in protecting the filter components. Most protective relays are sensitive to the fundamental 60 Hz (or 50 Hz) component while they are insensitive to the 5th, 7th, or the 11th harmonic components. Thus the filter can be easily overloaded by harmonic currents being imported from other pieces of equipment or from the utility due to their designed low harmonic impedance.

In addition to the 5th harmonic component, a 6-pulse rectifier unit with a dc bus capacitor generates strong 7th, and 11th harmonic currents. In order to bring down the overall Total Current Harmonic Distortion (TCHD) to an acceptable level, one has to provide tuned filters for filtering those harmonic components as well. It is a general practice to provide 5th and 7th tuned harmonic filters. To filter out the higher harmonic components, a high-pass filter is provided. A typical filter structure used commonly in the industry is shown in FIG. 3.

The basic design strategy adopted for designing each of the filter components shown in FIG. 3 is well known and has been thoroughly ,investigated and documented in the prior art. It is clear from the discussions in the prior art that there is a serious danger of using the filter combination of FIG. 3 if one fails to consider the network impedance to which the filter is to be connected. The combination of the filter with the power system network can set up a new resonance frequency which can be excited in the presence of the wade harmonic spectrum generally associated with variable frequency drives. Thus a conventional tuned filter may cause more problems that it solves. Independent authorities have arrived at the same conclusion regarding the care needed in employing conventional tuned filters for harmonic reduction as evidenced in many articles published in leading journals.

An alternative to using a number of tuned passive filters is to use an active low-pass filter in the power supply line. Such a low-pass scheme is described in "An Active Power Factor Correction Technique for Three-Phase Diode Rectifiers" by Prasad and Ziogas (*IEEE Transactions on Power Engineering*, Volume 6, Number 1, January 1991). However, boost inductors and an active control circuit are necessary for the satisfactory operation of the filter, increasing its complexity.

SUMMARY OF THE INVENTION

It is an object of the invention to provide a passive harmonic filter of reduced size and weight which can significantly reduce the distortions of the input voltage and current waveforms caused by the variable frequency drives. The invention provides a harmonic filter that filters out the harmonic currents produced by VFDs or other powerline harmonic generators without causing problems in the network to which they are connected. The novel filter provides significant reduction in the distortions of input voltage and current waveforms while overcoming all the typical problems associated with an ordinary tuned harmonic filter.

It is a further object of the invention to provide a VFD power center which improves use of space and makes maintenance, service and inspection very easy. This is achieved by using a VFD power center which is compact in size, adapted to overcome the defects of individual VFD enclosures, and is easy to be maintained and inspected.

These and other features of the invention will be more readily understood upon consideration of the attached drawings and of the following detailed description of those drawings and the presently preferred embodiments of the invention.

DETAILED DESCRIPTION OF THE INVENTION

Figure 1:
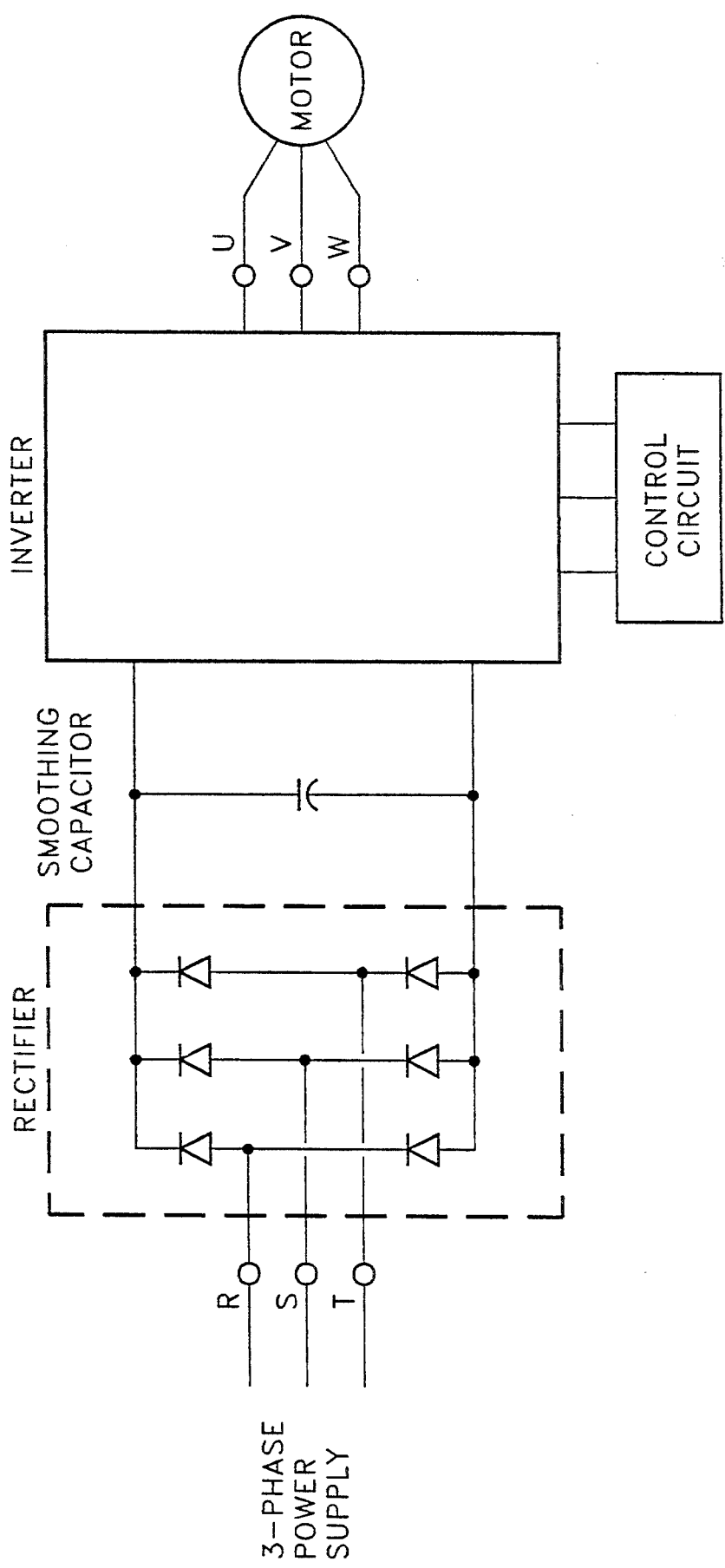
FIG. 1 illustrates a prior art circuit comprising a diode rectifier bridge configuration with a dc bus capacitor.
Figure 2:
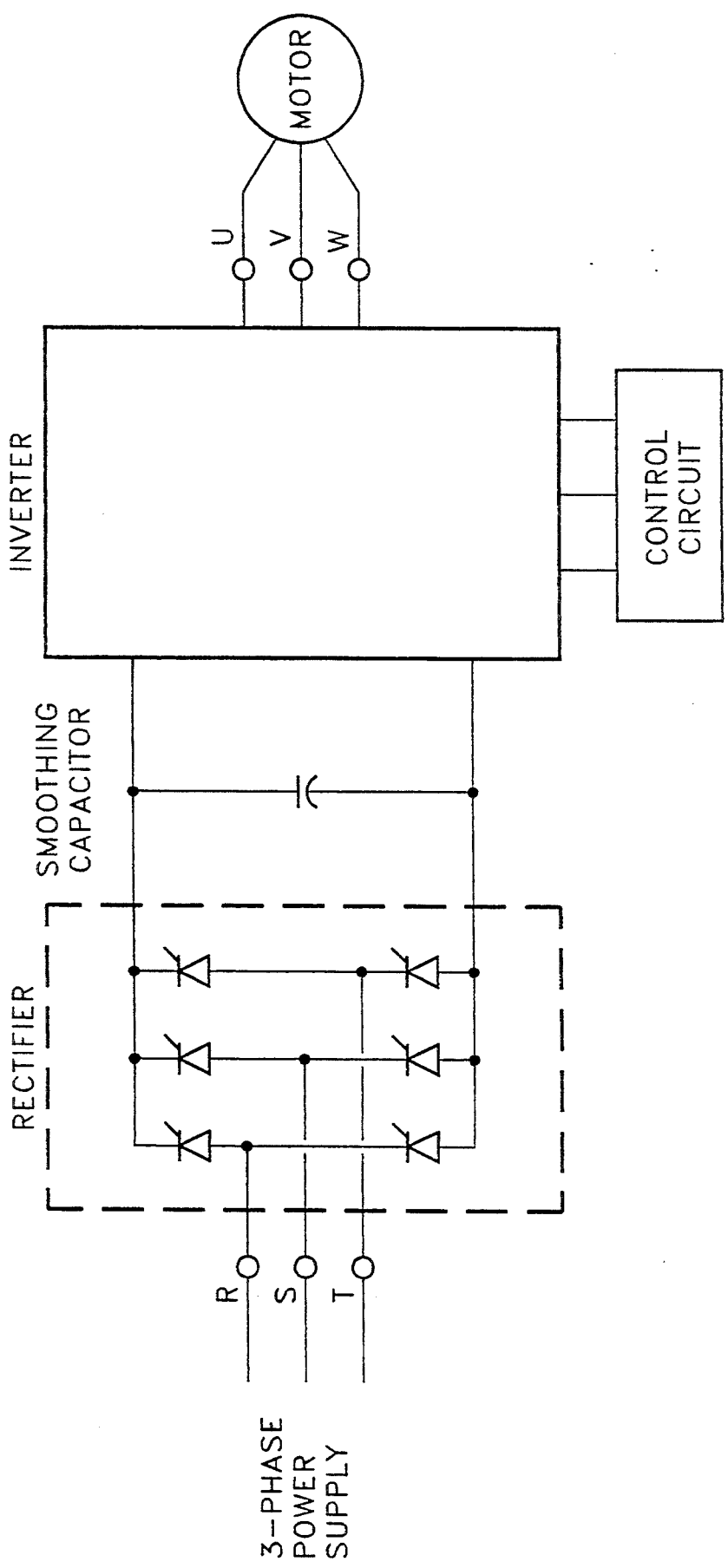
FIG. 2 illustrates a prior art circuit comprising a thyristor rectifier bridge used to regulate a dc bus voltage.
Figure 3:
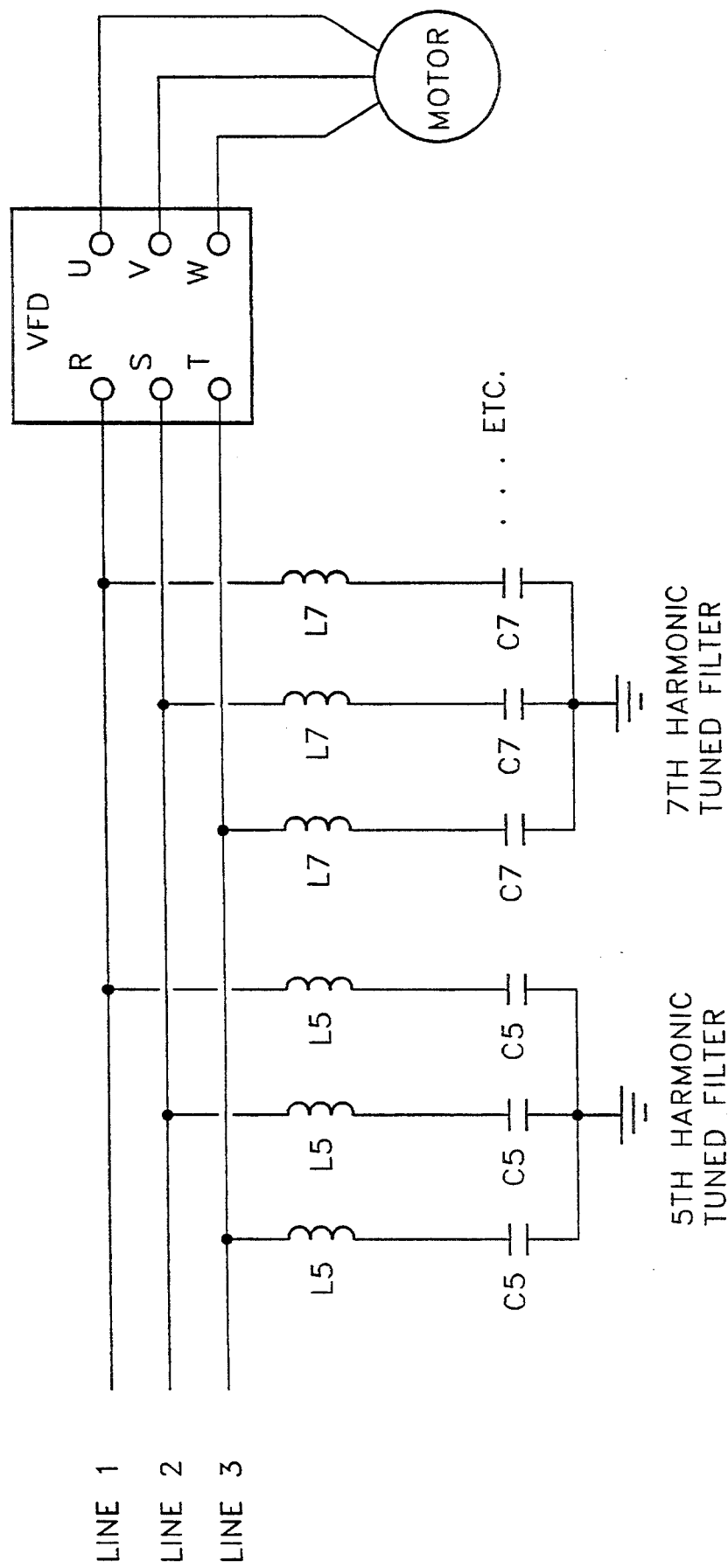
FIG. 3 illustrates a prior art circuit comprising two tuned harmonic filters.
Figure 4:
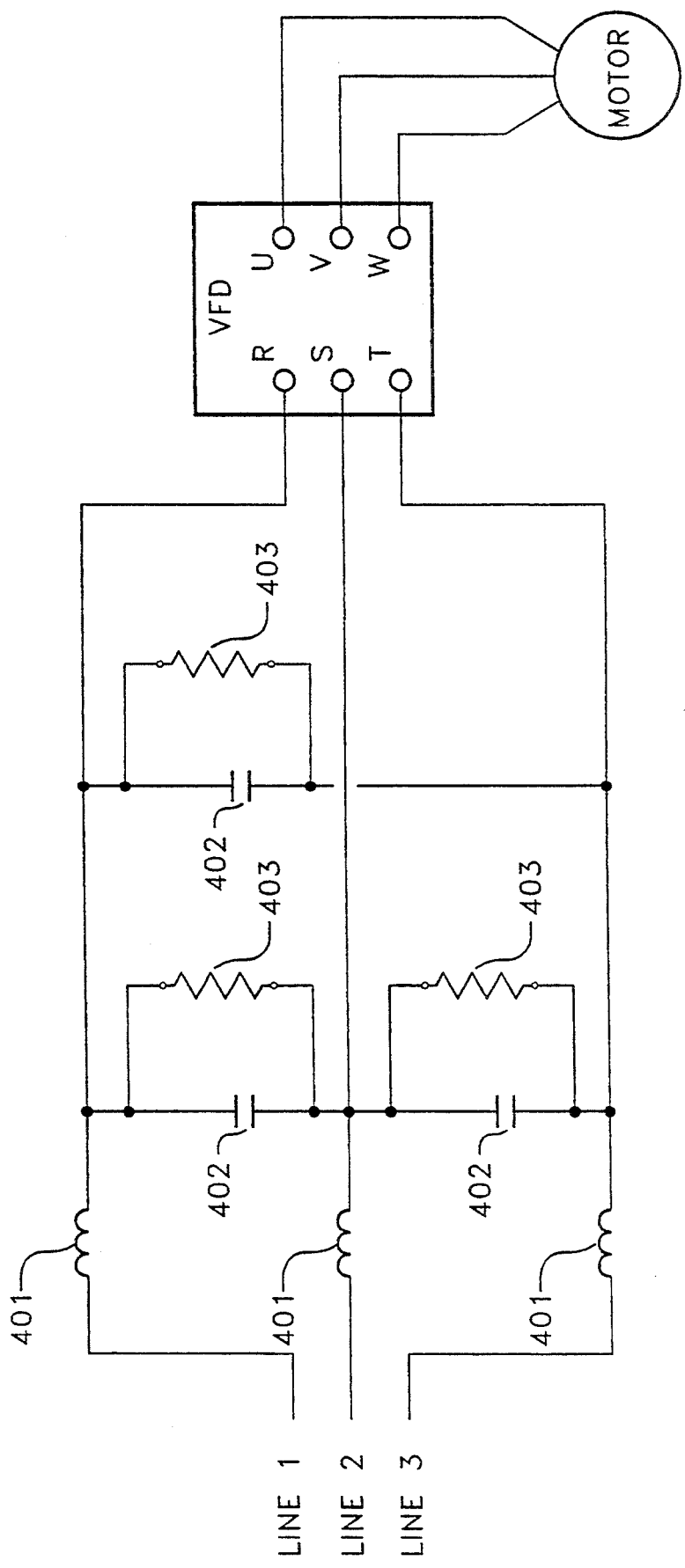
FIG. 4 is the schematic diagram of the harmonic filter of the invention.

The novel harmonic filter which is presented here is geared to overcome the typical problems associated with an ordinary tuned harmonic filter as discussed above. Instead of arranging the tuned filter section as shown in Prior Art 3 (with the inductor L in series with the capacitor C), as illustrated in FIG. 4 the new harmonic filter involves placing inductors 401 in each power line between the VFD and the power source, and capacitors 402 across the load (VFD 404 driving motor 405) on the load side on inductors 401. For a three-phase power system, the circuit shown in FIG. 4 would be used, with an inductor 401 in each supply (or "hot") power line and a capacitor 402 across each pair of supply power lines, while for a single-phase power system there would be a single inductor 401 in the supply power (hot) line and a single capacitor 402 between the hot and neutral power lines, on the load side of inductor 401. Note that this results in capacitors 402 being across each pair of power terminals of the load.

Using this L-C low-pass filter configuration considerably changes the dynamics of the circuit, and the values of inductance for inductors 401 and capacitance for capacitors 402 are consequently redesigned to yield low values of Total Current Harmonic Distortion (TCHD) and Total Voltage Harmonic Distortion (TVHD). The advantages of arranging inductors 401 and capacitors 402 in this manner include:

(a) Inductors 401 of the filter provides sufficient impedance so as not to import any harmonic already existing in the line. This prevents import of large harmonic currents into capacitors 402 from external harmonic sources. Consequently, capacitors 402 does not get overloaded.

(b) Inductors 401 also isolate the high voltage appearing across capacitors 402 at the fundamental frequency from appearing at the supply line. Any other equipment connected on the same network at the point of common coupling will not see the rise in voltage due to the tuned harmonic filter.

(c) The harmonic currents generated by the VFD will not flow out to the power system since it sees a low impedance path through capacitors 402. Hence, capacitors 402 are designed to handle only the harmonic currents generated by the VFD to which it is connected.

(d) There exists no danger of creating resonance with the already existing power system network because of the large value of inductors 401. The inductors 401 act as a buffer between the power system network and the VFD system.

(e) Since effective filtering is achieved by only one filter section as discussed above, there is no need of using individual tuned filters for the 5th and 7th harmonics. This reduces the overall cost of providing filtering and also reduces the overall size of the filter equipment.

Resistors $403$ serve as the bleeder resistors to discharge capacitors 402. When the system is energized capacitors 402 get charged and discharged in a cyclic manner based on the input supply frequency. On de-energizing, the worst case occurs when the capacitors are switched off at the peak of the input voltage. To avoid injury to service personnel, it is a common practice to use bleeder resistors 403 to discharge capacitors 402.

Figure 5:
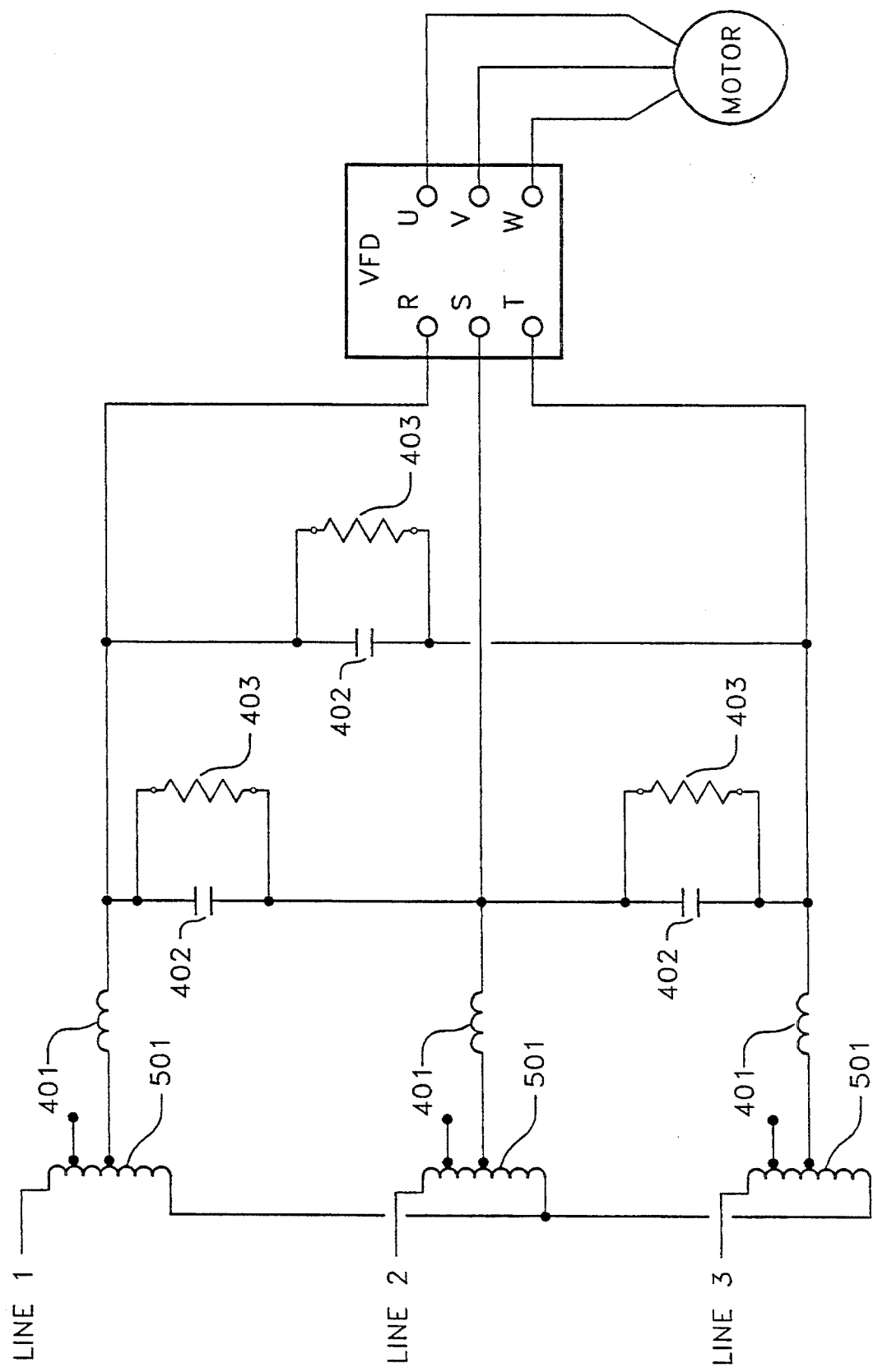
FIG. 5 is the schematic diagram of the harmonic filter of FIG. 4, with the addition of a buck-transformer to handle overvoltage at the VFD terminals.

However, the above arrangement is not devoid of drawbacks. One major concern is the overvoltage caused by capacitors 402 at the input terminals of the VFD. This is so because at fundamental frequency, capacitors 402 acts as a power factor correcting capacitor and cause an overvoltage to appear at the VFD input terminals. In order to overcome this problem, means to reduce the overvoltage at the VFD input terminals is employed. In the preferred embodiment, passive means for reducing the overvoltage is provided by a buck-transformer at the front-end of the entire L-section filter formed by inductors 401 and capacitors 402. Capacitors 402 whose values are selected by the procedure detailed below cause an approximately 17% overvoltage. Consequently, buck-transformers 501 with a 17% tap are introduced in the circuit as shown in FIG. 5. In addition to a 17% tap, in the preferred embodiment buck-transformers 501 also have a 22% tap to accommodate a maximum of 10% rise above nominal line voltage at the point of common coupling.

Buck-transformers 501 can be realized in one of the following two ways:
(a) Three single-phase transformers connected as shown in FIG. 5, or
(b) A three-phase transformer wound on a three-phase "E" core.

Considering space and cost, option (b) is preferred.

To get the buck effect it is necessary to electrically connect the secondary and the primary windings of transformers 501. The three-phase input power is connected to the start of the three secondary windings (S1 in FIG. 5). The ends of the three secondary windings are then electrically connected to the start of the three primary windings, respectively (S2 to P1 in FIG. 5). Finally, the ends of the three primary windings are tied together to form a floating star point (S2 in FIG. 5). Tap T would be used instead of S2 to compensate for a lower-than-normal line voltage.

For a nominal 460 volt line voltage, a 240 volt primary winding and a 52.8 volt secondary winding with a tap at 40.8 volts would be used. This would give a value of approximately 358 volts at the 22% tap and 382 volts at the 17% tap.

An alternative to using the buck-transformer configuration discussed above would be to use an autotransformer with taps appropriate to the reduced output voltage desired, or other passive means of reducing the line voltage.

By making use of buck-transformers 501, the overvoltage effect is removed. This makes the present invention better than a tuned filter approach, which has the same overvoltage drawback. It also does not require an active control section, as with similar low-pass filters in the prior art.

The filter is designed using the following steps:

Step 1: Find the per unit impedance value of the VFD for which the filter is designed. For this, use of the following equation is made:

$$Z_{pu} = V_{pu}/I_{pu}$$
where $V_{pu}$ is the nominal line-to-neutral voltage, and $I_{pu}$ is the rated output current of the variable frequency drive.

Step 2: The inductance L for inductors 401 is then computed as follows:

$$L = \frac{Z_{pu} * 0.25}{2*pi*f} \text{ Henries}$$

Where f is the supply frequency in Hz, and $Z_{pu}$ is from step 1.

Step 3: The capacitance C for capacitors 402 is computed next:

$$C = \frac{(1/3)}{(2*pi)^2 * L * (f_r)^2} \text{ Farads}$$

Where L is from step 2 and $f_r$ is the resonant frequency of the circuit, selected to be between the 2nd and 3rd harmonic of the fundamental frequency.

Step 4: Determine the values for resistors 403 as follows. The rate of fall of voltage across a capacitor-resistor parallel arrangement is given by:

$$V_C = V_{Ci} e^{-t/RC}$$

where $V_{Ci}$ is the initial voltage across capacitors 402 at start of discharge, R is the value (in ohms) for resistors 403, and C is the value (in farads) for capacitors 402. Under worst case, $V_{Ci}$ is equal to the peak value of the input line-to-line voltage. The value of C used in the filter is calculated using the formula given below. Assuming it is desirable that the voltage across the capacitor drops to 1% of its initial value at the end of 1 minute, the value of resistors 403 can be computed to be:

$$R = \frac{-t}{C * \ln(v_C/v_{Ci})} \text{ Ohms}$$

If capacitors 402 have a value of 50 uF, this would give a value for resistors 403 of approximately 260 Kohms.

The peak energy stored in the capacitor is:

$$E_{peak} = (\tfrac{1}{2}) * C * V^2_{peak}$$

where $V_{peak}$ is peak value of supply voltage. For a 460+10% volt (nominal) supply voltage, it will be approximately 715 volts, giving a value of $E_{peak}$ of approximately 12.8 Joules. The power rating of bleeder resistor 403 is then:

$$P = (E_{peak}/t)$$

or 0.21 watts in this example. For safety sake, a half-watt resistor would be used for resistors 403.

The values computed for L and C produce an approximately 17% rise in voltage because of the capacitor C at the input terminals of the VFD. In order to overcome this problem, as discussed in the preceding paragraphs, buck-transformers 501 having a 17% tap is used.

The current ratings of the buck-transformers 501 and that of inductors 401 should conform to the maximum current rating of the VFD. The voltage rating of capacitors 402 should be at least 25% higher than the nominal line-to-line voltage of the system.

Experiments were conducted on a 30-hp drive to investigate the performance of the newly designed tuned filter. Some typical results were:

| 30-hp VFD WITHOUT ANY TUNED FILTER: | | |
|---|---|---|
| | Half-load | Full-load |
| Voltage THD (TVHD): | 3.4% | 4.0% |
| Current THD (TCHD): | 111.2% | 89.9% |
| Power Factor: | 0.66 (lag) | 0.74 (lag) |
| 30-hp DRIVE WITH INPUT FILTER: | | |
| | 30-hp load | 40-hp load |
| Voltage THD (TVHD): | 3.4% | 3.4% |
| Current THD (TCHD): | 6.8% | 6.4% |
| Power Factor: | 0.93 (lead) | 0.97 (lead) |

Figure 6:
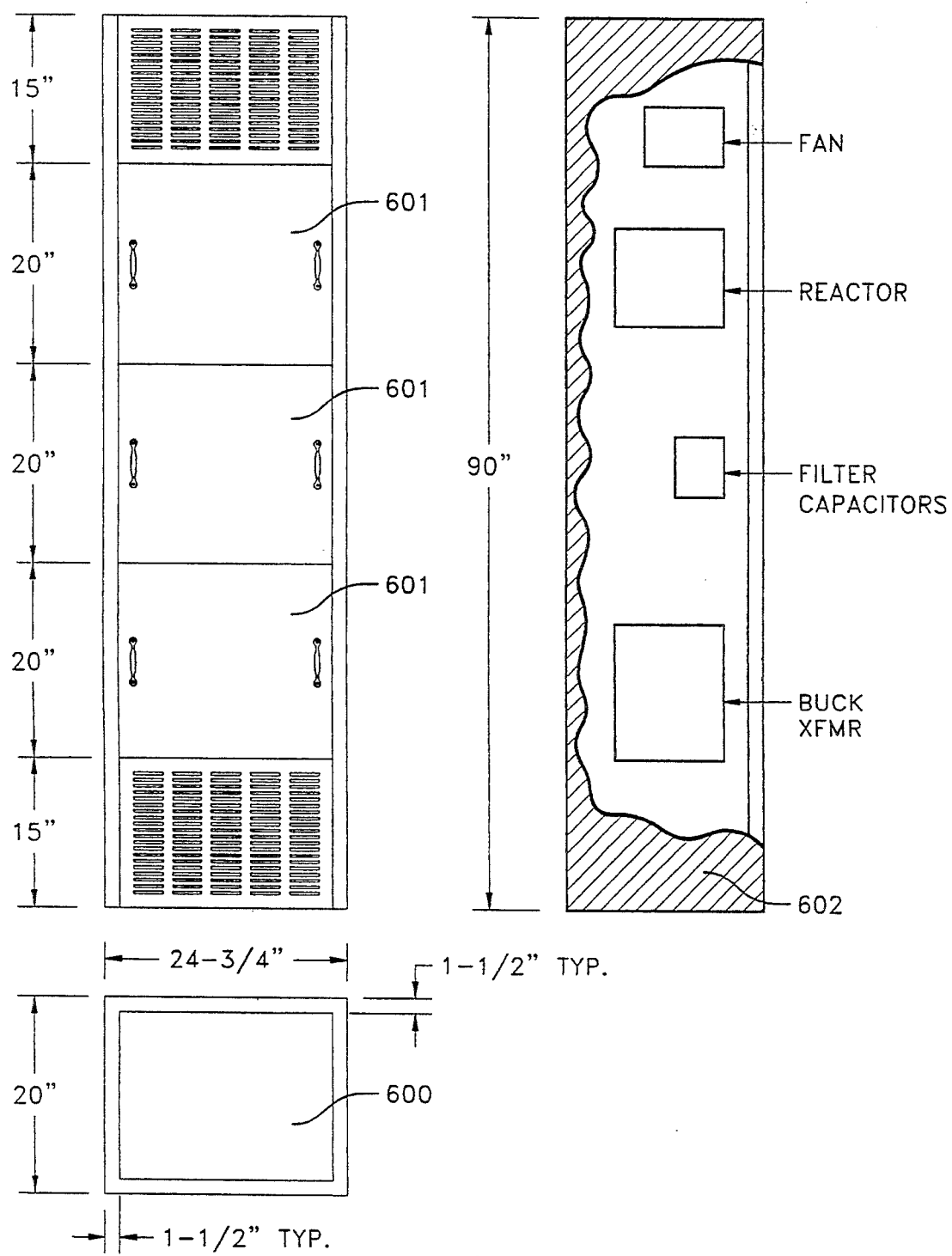
FIG. 6 is a drawing of the enclosure used in the preferred embodiment.

In the preferred embodiment, the VFDs and their harmonic filters are housed in a common enclosure called the VFD power center. FIG. 6 depicts the VFD power center of the preferred embodiment. It comprises a metal enclosure 600 having multiple doors 601 which provide access to multiple cabinets where the VFDs and the filter are housed. Doors 601 are attached to frame 602 (with horizontal and vertical members) using releasable hinges 603, and secured by latch 606. Sliding supports 604, or other movable means for supporting a VFD, allow each VFD to be brought out of their cabinet and simultaneously provides support for the VFDs while they are out of the cabinets. In the preferred embodiment, the portion of sliding support 604 attached to VFD 404 can be separated from the portion of slide support 604 attached to enclosure 600.

This provides easy inspection, service and maintenance for each VFD 404 without disturbing the remaining units. This novel technique for mounting VFDs sideways on slides allows the mounting of several VFDs in a relatively small space when compared to prior mounting techniques where a single VFD was mounted in its own enclosure. In the preferred embodiment, this savings in space yields enough room for the filter assembly.

Furthermore, this modular structure of the power center allows for its easy expansion to support additional VFDs. Because the support is provided by metal frame 602, the front doors 601 and side walls 605 can be easily detached from the main frame of the power center without affecting the integrity of whole system.

Metal enclosure 600 is constructed so that its vertical and horizontal frame members, and other components, are bolted together, rather than welded or riveted, making it easy to disassemble for installation at its final location, or removal and recycling when it is no longer in service. It can be manufactured to the same size as standard motor control centers (nominally 90 inches high and 20 inches deep), resulting in a convenient and clean installation. If necessitated by the surrounding environment, metal enclosure 600 can incorporate forced air ventilation or other cooling methods to provide a consistent ambient temperature for the equipment mounted within.

In the preferred embodiment, the VFD power center has a plurality of openable mounting compartments, a three phase power terminal block, a plurality of VFDs 404 each mounted in separate compartments supplied with power from the ac source through individual disconnects 607, and a single harmonic filter of the type described above for the whole system to improve the voltage and current waveforms of the incoming power source feeding the power center.

The power center eliminates the need for separate enclosure for each individual VFD, making more efficient use of space. It also lowers the installation cost through reduction in amount of cable, materials and labor time as compared to the same number of VFDs mounted in separate enclosures.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

We claim:
1. A variable frequency drive system comprising:
 A. a variable frequency drive;
 B. a source of AC power for said variable frequency drive; and
 C. a passive L-C low-pass filter having its input connected to said source of AC power and its output connected to said variable frequency drive, comprising:
  a. an inductor interposed in each power supply line between said variable frequency drive and said source of AC power;
  b. a capacitor across each pair of outputs of said passive L-C low-pass filter; and
  c. passive means for reducing overvoltage at said variable frequency drive's input terminals.

2. A variable frequency drive system as in claim 1, wherein said passive means for reducing overvoltage comprises a buck-transformer.

3. A variable frequency drive system as in claim 2, wherein said buck-transformer includes an additional tap to accommodate a higher-than-normal line voltage.

4. A variable frequency drive system as in claim 1, further comprising a single enclosure having a frame, said single enclosure containing a plurality of said variable frequency drive and said L-C low-pass filter.

5. A variable frequency drive system as in claim 4, wherein each of said plurality of variable frequency drives is mounted on slides attached to said single enclosure's frame.

6. A variable frequency drive system as in claim 4, wherein said single enclosure's frame comprises vertical and horizontal members bolted together.

7. A passive low-pass powerline filter for a harmonic-generating AC device comprising:
 A. an inductor interposed in each power supply line between said filter's input and said filter's output;
 B. a capacitor across each pair of outputs of said filter; and
 C. passive means for reducing overvoltage at said filter's output.

8. A passive low-pass powerline filter as in claim 7, wherein said passive means for reducing overvoltage comprises a buck-transformer.

9. A passive low-pass powerline filter as in claim 8, wherein said buck-transformer includes an additional tap to accommodate a higher-than-normal line voltage.

10. A variable frequency drive power center comprising:
 A. a plurality of variable frequency drives;
 B. a single enclosure containing said plurality of variable frequency drives; and
 C. a passive L-C low-pass filter at the input of at least one of said plurality of said variable frequence drives, said filter comprising:
  a. an inductor interposed in each power supply line between said filter's input and said filter's output;
  b. a capacitor across each pair of outputs of said filter; and
  c. passive means for reducing overvoltage at said filter's output.

11. A variable frequency drive power center as in claim 10, wherein said passive means for reducing overvoltage comprises a buck-transformer.

12. A variable frequency drive power center as in claim 11, wherein said buck-transformer includes an additional tap to accommodate a higher-than-normal line voltage.

13. A variable frequency drive power center as in claim 10, wherein each of said plurality of variable frequency drives is mounted on slides within said single enclosure.

14. A variable frequency drive power center as in claim 10, wherein said enclosure comprises vertical and horizontal members bolted together.

* * * * *